US010404415B2

(12) United States Patent
Morioka

(10) Patent No.: US 10,404,415 B2
(45) Date of Patent: *Sep. 3, 2019

(54) COMMUNICATIONS SYSTEM, INFRASTRUCTURE EQUIPMENT AND METHOD

(71) Applicant: SONY CORPORATION, Tokyo (JP)

(72) Inventor: Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/903,191

(22) PCT Filed: Jul. 16, 2014

(86) PCT No.: PCT/EP2014/065285
§ 371 (c)(1),
(2) Date: Jan. 6, 2016

(87) PCT Pub. No.: WO2015/018616
PCT Pub. Date: Feb. 12, 2015

(65) Prior Publication Data
US 2016/0191209 A1    Jun. 30, 2016

(30) Foreign Application Priority Data
Aug. 6, 2013    (EP) .................................. 13179490

(51) Int. Cl.
*H04L 1/08*    (2006.01)
*H04L 1/02*    (2006.01)
(Continued)

(52) U.S. Cl.
CPC ................. *H04L 1/08* (2013.01); *H04L 1/02* (2013.01); *H04L 5/0007* (2013.01);
(Continued)

(58) Field of Classification Search
CPC ................................. H04L 1/08; H04L 1/02
(Continued)

(56) References Cited

U.S. PATENT DOCUMENTS 9,307,559 B2 * 4/2016 McNamara ............ H04L 5/0007
9,973,308 B2 * 5/2018 Morioka ............... H04L 5/0007
(Continued)

FOREIGN PATENT DOCUMENTS

GB    2487757 A    8/2012
GB    2487780 A    8/2012
(Continued)

OTHER PUBLICATIONS

Search Report and Office Action issued in Chinese Application 2014800448800 dated Jun. 1, 2018.
(Continued)

*Primary Examiner* — Peter G Solinsky
(74) *Attorney, Agent, or Firm* — Xsensus, LLP

(57) ABSTRACT

A communications system including an infrastructure equipment, forming part of a mobile communications network, that transmits and receives data to/from a user device via a wireless access interface using a plurality of Orthogonal Frequency Division Multiplexing (OFDM) subcarriers that extend across a first bandwidth. The infrastructure equipment is configured to transmit repeatedly signals representing a same instance of user device payload data in a second bandwidth less than and within a first bandwidth, and includes a subset of the OFDM subcarriers. The user device is configured to receive one or more of the signals repeatedly transmitted across the second bandwidth, to store in a memory signals representing the repeatedly transmitted signals received across the second bandwidth and to combine the stored signals, and to detect the user device payload data
(Continued)

from the combined signals, the user device having been provided with an indication of the second bandwidth.

13 Claims, 6 Drawing Sheets

(51) Int. Cl.
*H04L 5/00* (2006.01)
*H04L 27/26* (2006.01)

(52) U.S. Cl.
CPC .......... *H04L 5/0044* (2013.01); *H04L 5/0053* (2013.01); *H04L 27/2602* (2013.01)

(58) Field of Classification Search
USPC ........................................................ 370/328
See application file for complete search history.

(56) References Cited

U.S. PATENT DOCUMENTS

| | | | |
|---|---|---|---|
| 2012/0263107 A1* | 10/2012 | Taghavi Nasrabadi | H04W 72/02 370/328 |
| 2012/0263141 A1 | 10/2012 | Taghavi Nasrabadi et al. | |
| 2013/0083753 A1* | 4/2013 | Lee | H04W 72/0453 370/329 |
| 2013/0155974 A1* | 6/2013 | Papasakellariou | H04W 72/042 370/329 |
| 2014/0010183 A1 | 1/2014 | McNamara et al. | |
| 2015/0245323 A1* | 8/2015 | You | H04W 72/042 370/329 |
| 2016/0127918 A1* | 5/2016 | Yi | H04W 84/047 370/329 |
| 2016/0149677 A1* | 5/2016 | Morioka | H04L 5/0007 370/329 |
| 2017/0127395 A1* | 5/2017 | Beale | H04W 72/042 |

FOREIGN PATENT DOCUMENTS

| | | | |
|---|---|---|---|
| GB | 2487782 | A | 8/2012 |
| GB | 2487906 | A | 8/2012 |
| GB | 2487907 | A | 8/2012 |
| GB | 2487908 | A | 8/2012 |
| GB | 2487909 | A | 8/2012 |
| GB | 2488513 | A | 9/2012 |
| JP | 2016-532292 | | 2/2016 |
| WO | 2012/104635 | A1 | 8/2012 |
| WO | WO 2012/104635 | A1 | 8/2012 |
| WO | 2013/093437 | A1 | 6/2013 |
| WO | WO 2013/093436 | A1 | 6/2013 |

OTHER PUBLICATIONS

Office Action dated Feb. 20, 2018 in Japanese Patent Application No. 2016-532291, with English-language Translation, 8 pages.
CATT, Coverage improvement analysis for low-cost MTC UEs, 3GPP TSG RAN WG1 Meeting #72 R1-130053, Jan. 18-Feb. 1, 2013, with cover page, 8 pages.
Alcatel-Lucent, (E)PDCCH coverage extension for MTC devices, 3GPP TSG-RAN WG1 Meeting #72bis R1-130941, Apr. 6, 2013, with cover page, 5 pages.
International Search Report dated Sep. 26, 2014 in PCT/EP2014/065285.
Chinese Office Action and Search Report dated Dec. 4, 2018 in Chinese Application No. 2014800448800.

\* cited by examiner

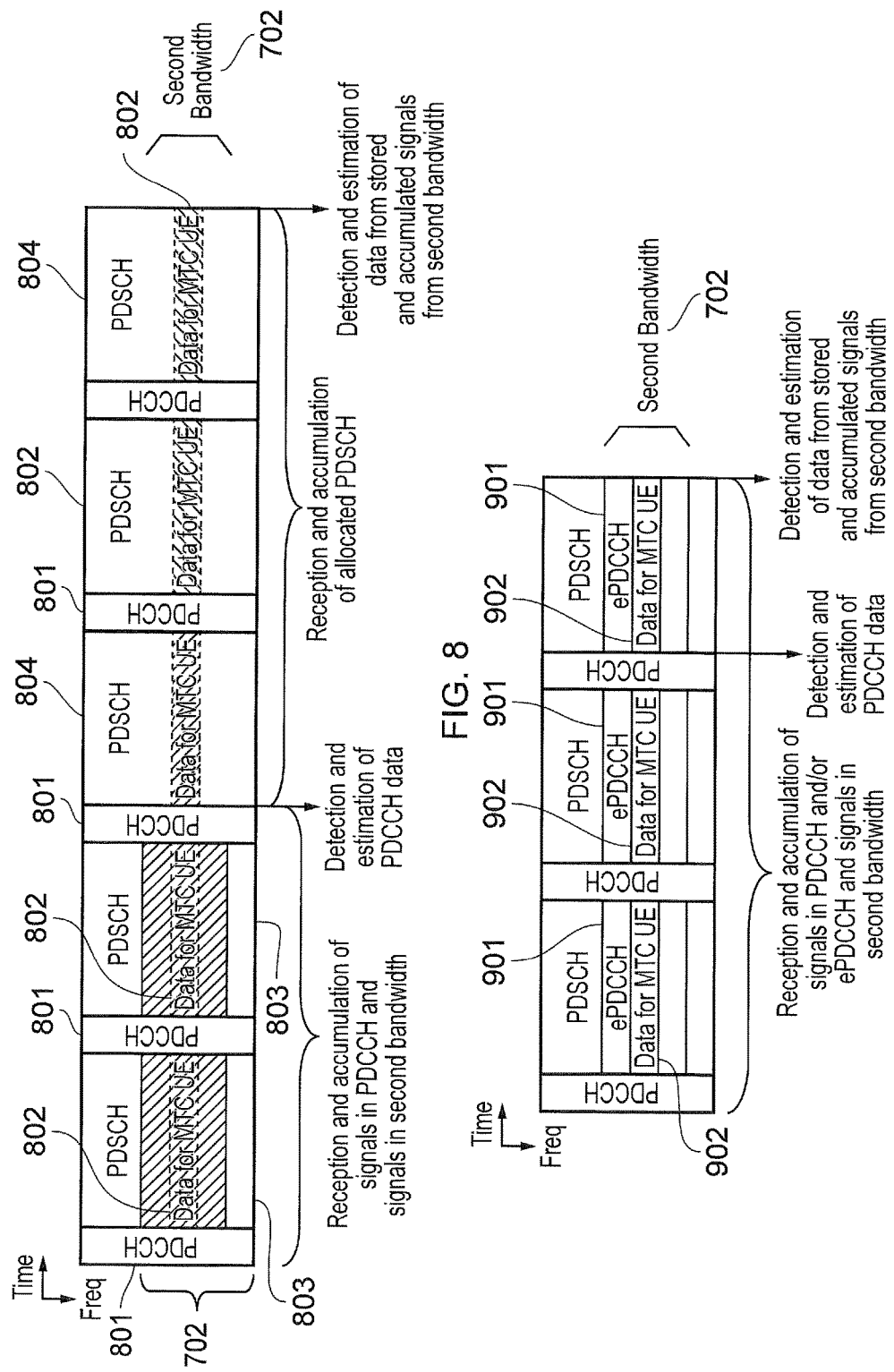

COMMUNICATIONS SYSTEM, INFRASTRUCTURE EQUIPMENT AND METHOD

CROSS-REFERENCE TO RELATED APPLICATIONS

The present application is based on PCT filing PCT/EP2014/065285 filed Jul. 16, 2014, and claims priority to European Patent Application 13 179 490.1, filed in the European Patent Office on Aug. 6, 2013, the entire contents of each of which being incorporated herein by reference.

FIELD OF THE INVENTION

The present invention relates to communications systems and infrastructure equipment for transmitting and receiving data, and methods of transmitting and receiving data.

BACKGROUND OF THE INVENTION

Fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy fourth generation networks is therefore strong and the coverage area of these networks, i.e. geographic locations where access to the networks is possible, is expected to increase rapidly.

The anticipated widespread deployment of fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) transmitting and receiving small amounts of data on a relatively infrequent basis. Examples include so-called smart meters which, for example, are located in a customer's house and periodically transmit information back to a central MTC server data relating to the customers consumption of a utility such as gas, water, electricity and so on.

The nature of MTC devices may lead to their disposal in locations where communication with mobile telecommunications systems such as those mentioned above may prove unreliable, even when taking into account increasing coverage. For instance, MTC devices such as smart meters may be located in the basement of a house or other hard to reach locations where signals from mobile telecommunications system may not be received at a sufficient strength because they have propagated over highly attenuating channels. Consequently, devices such as smart meters may be unable to perform reliable detection and estimation of data conveyed by the signals. Scenarios such as this may also occur when devices are near the border of a geographic area served a by mobile telecommunications system. Overcoming these problems by further extending the coverage of mobile communications networks would allow an increased number of devices to be supported by mobile communications networks.

The use of decreased coding rates and reduced order modulations schemes present a potential solution to improving the reliability of detection and estimation of data at a device. However, often a restricted set of possible modulation and coding rates are supported by devices, especially low cost ones such as MTC devices, and therefore improvement via coding changes may be limited. Recently it has been suggested that transmission repetition may present an alternative solution to extending coverage to mobile devices which are currently unable to be reliably served by a mobile communications network.

SUMMARY OF THE INVENTION

According to an example embodiment, there is provided a communications system comprising an infrastructure equipment for forming part of a mobile communications network where the infrastructure equipment is arranged to transmit and receive data to and from a user device via a wireless access interface. The wireless access interface is provided by the infrastructure equipment using a plurality of Orthogonal Frequency Division Multiplexing (OFDM) subcarriers and the plurality of OFDM subcarriers extend across a first bandwidth. The infrastructure equipment is configured to transmit repeatedly signals representing a same instance of user device payload data in a second bandwidth, where the second bandwidth is less than and within the first bandwidth and includes a subset of the OFDM subcarriers. The user device is configured to receive one or more of the signals repeatedly transmitted across the second bandwidth, to store in a memory signals representing the repeatedly transmitted signals received across the second bandwidth and to combine the stored signals. The user device is also configured to detect the user device payload data from the combined signals, where the user device has been provided with an indication of the second bandwidth.

According to another example embodiment, the infrastructure equipment is configured to transmit repeatedly signals representing a same instance of user device control data in the first bandwidth, the user device control data providing an indication of a location of the signals representing the user device payload data in the second bandwidth. The user device is configured to receive one or more of the signals representing the user device control data repeatedly transmitted across the first bandwidth, to store in the memory signals representing the repeatedly transmitted signals received across the first bandwidth, and to combine the stored signals representing the repeatedly transmitted signals received across the first bandwidth. The user device is also configured to detect the user device control data from the combined signals representing the repeatedly transmitted signals received across the first bandwidth, where the detection of the user device payload data from the combined signals received across the second bandwidth is based on the indication of the location of the signals representing the user device payload data in the second bandwidth.

Repeating transmissions of signals representing user device payload data enables a user device which is unable to detect and estimate user payload data from a single instance of the signal, to combine multiple signal instances I. The combined signals may then be utilised to increase the strength of the received signal or provide additional coding bits and therefore improve an accuracy of the subsequent data estimation. The repetition of signals representing a same instance of data provides an alternative to decreasing a coding rate and or modulation order of data when attempting to increase the accuracy of data detection and estimation at a receiver of a user device when attempting, for example, to increase the coverage of a mobile network. The use of repetition may be useful for example, when it is not possible to alter coding rates or modulation orders or they can not be further reduced because of compatibility requirements within a system Repetition may also present an alternative to coding rates changes, when the capabilities of intended receiving devices are limited. For instance, a machine type communications (MTC) device may be unable to perform complex decoding procedures but can receive multiple instance of signal and combine the received signals. Transmitting repetitions of signals representing user device payload data within a second bandwidth which is less than and within the first system bandwidth reduces the signals that a user device is required to store and combine when the location of signals representing the user device payload data within the second bandwidth is not yet known. For instance, before user device control data has been detected and estimated, the user device is required to store signals from the second bandwidth as opposed to across the first bandwidth. This approach therefore reduces memory requirements at the user device for storing repeated signals representing user payload data whilst still allowing the storage and accumulation of the signals representing the user device control data and the user device payload data to be substantially concurrent, therefore reducing the acquisition time of the user device payload data.

The expression "signals representing a same instance of user device payload data or user device control data" is used to include various techniques for transmitting data which represent the same user data, which can be combined to increase the likelihood of correctly recovering the user data. In one example the repeated transmission of the signals representing the user data is a repetition of the same signals. In other examples the user data may be encoded so that incremental redundancy can be used in which an amount of parity of codeword digits are increased by the repeated transmission of the signals, such that the repeated signals may be different.

According to another example embodiment, the wireless access interface provided by the plurality of OFDM subcarriers is divided into a plurality of time periods and the repeated signals representing the user device payload data are transmitted in a same set of resources of the wireless access interface in a first time period and in a second time period.

Repeating of signals representing the user device payload data in the same set of resources within different time period means that the channel over the signals propagate may be substantially similar and therefore may simplify the combining of the signals. It may also be beneficial because the user device is only required to detect and estimate data from a particular portion of the second bandwidth.

According to another example embodiment, the infrastructure equipment is configured to transmit the indication of the second bandwidth to the user device prior to the repeated transmissions of the signals representing the user device control data.

Transmitting an indication of the second bandwidth to the user device prior to the transmission of control data allows the user device to reduce the bandwidth across which is receives signals that may include user device payload data to the second bandwidth without having first to have received signals representing the user device control data. Consequently, the signals representing the user device control data and the signals representing the user device payload data may be received and stored simultaneously.

According to another example embodiment, the user device is configured to receive user device payload data within a virtual carrier of a predetermined bandwidth, the second bandwidth being approximately equal to the predetermined bandwidth, and the predetermined bandwidth includes a set of the OFDM subcarriers that is substantially similar to the OFDM subcarriers that form the subset of the OFDM subcarriers included in the second bandwidth.

Configuring the second bandwidth to be approximately equal to a virtual carrier bandwidth allows the repetition of signals to be integrated with the virtual carrier concept for user devices such as machine type communication (MTC) devices. This allows the operation of such devices to be simplified because it reduces the bandwidth that MTC devices operate to receive payload data compared to having a second bandwidth which is separate from the virtual carrier.

Various further aspects and features of the present invention are defined in the appended claims, including but not limited to, an infrastructure equipment and methods of communicating between a user device and an infrastructure equipment

BRIEF DESCRIPTION OF THE DRAWINGS

Embodiments of the present disclosure will now be described by way of example only with reference to the accompanying drawing in which like parts are provided with corresponding reference numerals and in which:

FIG. 8 provides a schematic diagram of LTE subframes where signal repetition is implemented in accordance with an embodiment of the present technique;

FIG. 9 provides a schematic diagram of LTE subframes where signal repetition is implemented in accordance with an embodiment of the present technique.

DETAILED DESCRIPTION OF EXAMPLE EMBODIMENTS

Mobile Communications System

Figure 1:
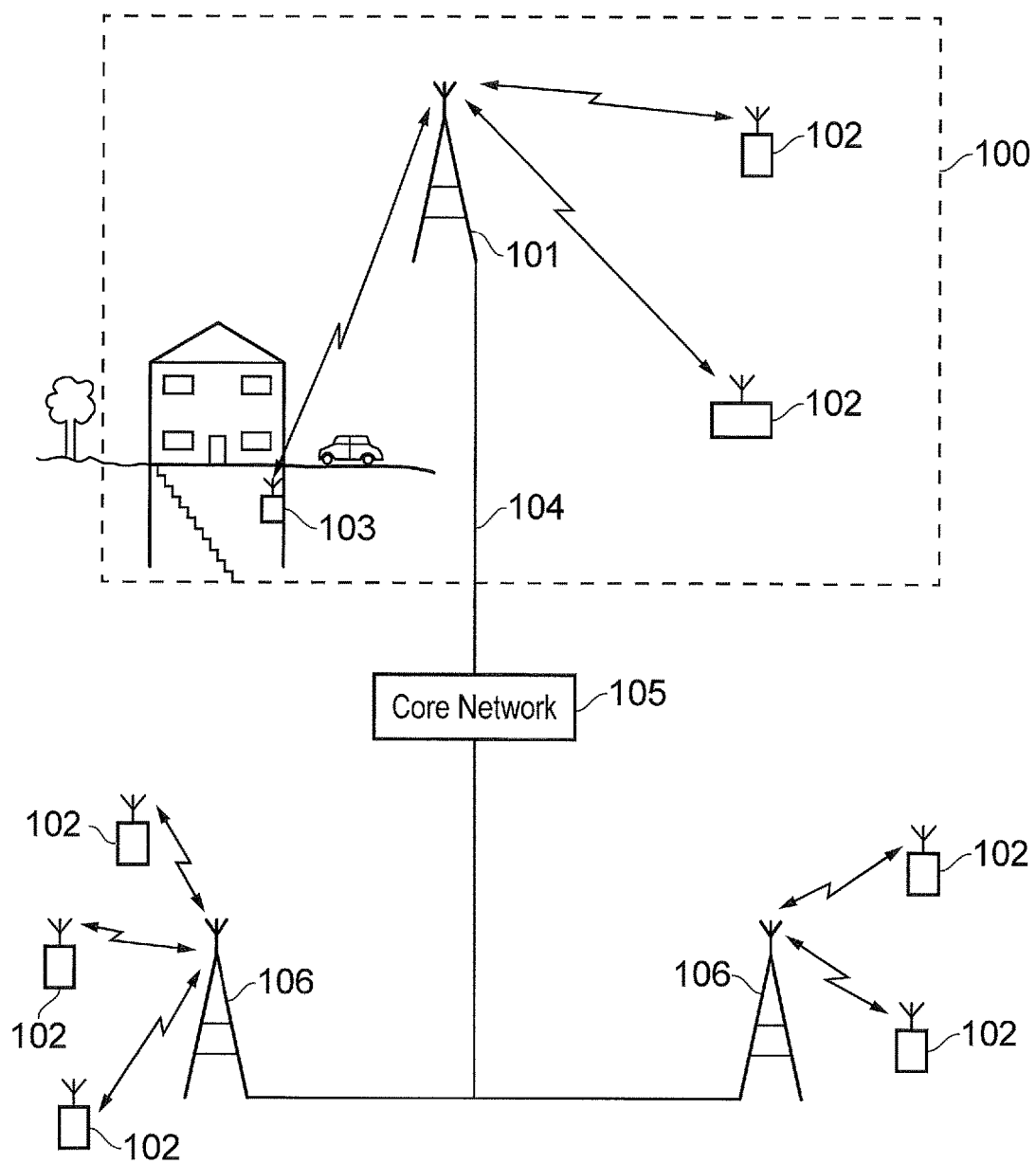
FIG. 1 provides a schematic diagram of a wireless communications system.

FIG. 1 provides a schematic diagram of a mobile communications system 100 for transmitting and receiving data to and from one or more user devices, where the communications system may for example operate in accordance with 3GPP Long Term Evolution (LTE). The communications system comprises infrastructure equipment 101 such as a base station or enhanced nodeB (eNodeB) which forms part of a mobile communications network and is configured to provide a wireless access interface to one or more user devices 102 103. The user devices 102 103 may for example be mobile phones, machine type communication (MTC) devices such as smart meters or information aggregation devices in cars or medical devices, or tablet computers. Within the wireless access interface the infrastructure equipment transmits signals representing the data to the one or more user devices. In FIG. 1 user devices 103 provides an example of a smart meter located in the basement of a house. The infrastructure equipment 101 is communicatively linked via communication link 104 to a core network 105 which may in turn be linked to further infrastructure equipment 106 and other communications networks and systems, where the further infrastructure equipment may itself be linked to one or more user devices 102.

Figure 2:
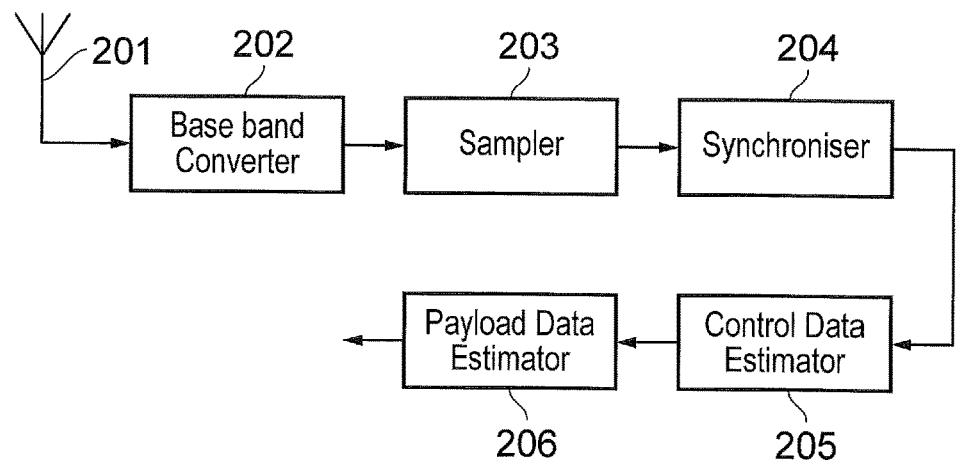
FIG. 2 provides a schematic diagram of a receiver of a user device of the communications system of FIG. 1.
Figure 3:
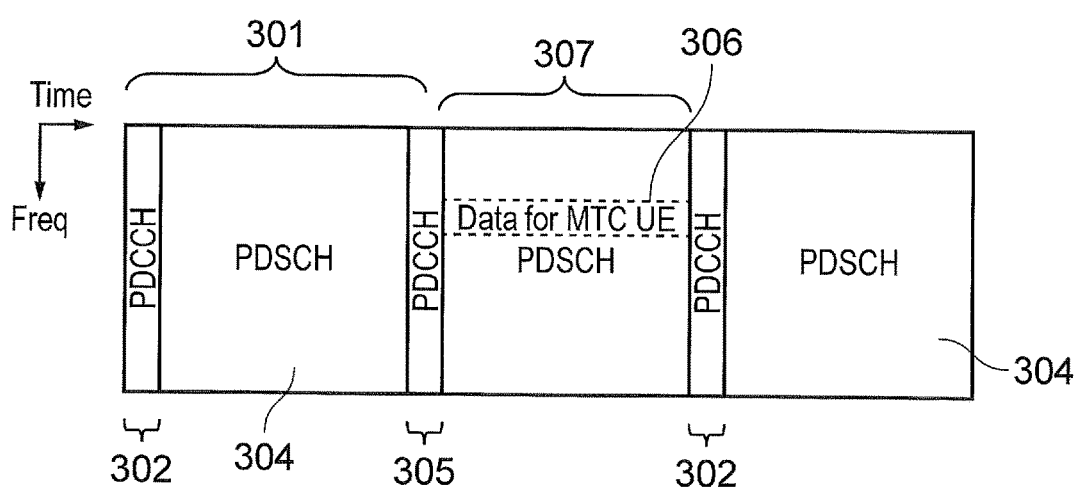
FIG. 3 provides a schematic diagram of LTE subframes.

In examples where the system 100 is an LTE system, the wireless access interface will be provided in accordance with orthogonal frequency division multiplexing (OFDM) where downlink resources are temporally divided in a plurality of time periods and divided in frequency into a plurality of subcarriers where the subcarriers form in the time domain OFDM symbols that convey signals which represent data to be transmitted to the user devices. The data transmitted to the users devices may consist of control plane data and user plane data where the control plane data coveys control data required by the user devices in order to communicate in the downlink (from infrastructure equipment to user device) and uplink (from user device to infrastructure equipment) with the infrastructure equipment, and user plane data conveys user device payload data. Further discussion of the wireless access interface is presented below.
User Device Receiver FIG. 2 provides a schematic diagram of a simplified receiver that may be found in a user device configured to receive and transmit data in the communications system of FIG. 1. In an example where the system 100 is an LTE system, the receiver may for example be an OFDM receiver. An antenna 201 receives signals transmitted from the infrastructure equipment over a channel and passes them to a baseband converter 202 which down converts the received signal to baseband frequencies. The baseband signal is then sampled by a sampler 203 at a sampling rate suitable for the baseband frequencies. A synchroniser 204 is then configured to detect the timing of the control plane data and user plane data before processing of the synchronised signal by a control data estimator 205 and a payload data estimator 206. The control data estimator estimates user device control data from signals representing the control data and provides information to payload data estimator which is required to estimate the user device payload data from the signals representing the user device payload data. As mentioned above, FIG. 2 provides a simplified OFDM receiver and therefore a number of elements of an OFDM have not been included. For example, frequency offset correction, transformation of the received signal into the frequency domain for equalisation and data estimation, guard interval removal etc. However, the processes performed by these elements and further elements may be performed using any suitable processing means known in the art.
Downlink Resource Allocation FIG. 3 provides a simplified example of downlink resource allocation, which may for example being applicable in an LTE system. The downlink resources are temporally divided into periods referred to as subframes 301 where a time period referred to as a radio frame may be formed from 10 subframes and the subframes may be 1ms in duration. The downlink resources are divided in frequency into a plurality of subcarriers, where the number of subcarriers may vary between approximately 128 and 2048 dependent upon the bandwidth of the downlink resources, where possible downlink bandwidths may include for example 1.25 MHz, 2.5 MHz, 5 MHz, 10 MHz, 15 MHz and 20 MHz. Each subframe may be further divided in time into two 0.5 ms slots where a slot comprising 12 subcarriers may be referred to as a resource block.

Each subframe includes control or signalling data which may for example be transmitted over a physical channel such as a physical downlink control channel (PDCCH) in LTE, where the control data indicates which downlink resources, in terms of subcarriers, slots and timing within the subframes, have been allocated to each of the user devices currently being served by the infrastructure equipment via the wireless access interface. Payload data is transmitted in the downlink over a data channel such as a physical downlink shared channel (PDSCH) in LTE, where the control data indicates to a user device a location in the data channel in which its payload data will be transmitted and the parameters required to estimate the payload data. Payload data may for example include uplink resource allocations, a request for information from the infrastructure equipment or information for an application running on the user device In FIG. 3, three downlink subframes of an LTE system are illustrated where control data is transmitted over the physical downlink control channel (PDCCH) and user device payload data is transmitted across the physical downlink shared channel (PDSCH). In an example reception routine, a user device, such as an MTC device, detects signals representing control data transmitted across the PDCCH 302 303 at the beginning of each subframe 301. The user device will then estimate the control data received across the PDCCH of each subframe in order establish whether it has been allocated resources in the PDSCH of the corresponding subframe. If within the control data of the PDCCH there is no indication of user payload data intended for the user device i.e. PDCCH 302, the user device will not attempt to receive signals which from the following PDSCH i.e. PDSCH 304. However, if the estimated control data indicates to the user device that there is data intended for it in the PDSCH i.e. PDCCH 305, the user device will receive signals that form the relevant portion 306 of the following PDSCH 307 that the control data has specified, and subsequently estimate the user payload data from the received signals. As can be seen from FIG. 3, the resources 306 in the PDSCH allocated to a user device may not extend over all the subcarriers in the subframe and/or over the full temporal length of the PDSCH in the subframe. This, along with the control data conveyed by signals transmitted across the PDCCH allows for the allocation of resources in the PDSCH to a plurality of user devices.

A user device is configured to detect and estimate payload data conveyed in the PDSCH. Accurate detection and estimation of data is dependent on a number of factors, for instance, knowledge of the location of the signals representing the payload data in a subframe and reception of the signals representing the user payload data at a sufficient signal strength and quality. In turn, knowledge of the location of the signals representing the payload data is dependent upon receiving the signals across the PDCCH at a sufficient signal strength and quality so that the user device control data can be detected and accurately estimated. Consequently, receiving signals representing user device control data and payload data at a sufficient signal strength are both required in order to detect and recover payload data in the downlink of an LTE communication system or any other equivalent communications system.

During conventional operation of a user device in an LTE network, if the user device control data cannot be accurately estimated and recovered from the signals transmitted and received across the PDCCH and/or the user device payload data cannot be accurately estimated and recovered from the PDSCH, the user device data is unable to be received by the user device. This may occur for example when the channel between the infrastructure equipment and the user device is highly attenuating thus resulting in highly attenuated signals being received at the receiver. In such a case, the user device may indicate to the infrastructure equipment that the user payload data has or has not been received correctly via an ACK or NACK message and the infrastructure equipment will prepare to resend the payload data. The data may be retransmitted in a subsequent subframe, where each of the instances of the user device control data and associated payload data are independent from one another and may be transmitted in different portions of the PDCCH and PDSCH, respectively. This procedure may be sufficiently robust for user devices which experience variable channels due to mobility for instance, because poor channel conditions may improve in the near future. Consequently, subsequent transmission(s) of signals representing the user device control data and payload data may be able to be received at a sufficient strength and quality that the user device control data and payload data can be accurately detected and estimated. However, in the case of user devices which are not mobile and/or are unlikely to experience channel conditions sufficient for reliable detection and estimation of control and or payload data, the above described procedure is unlikely to be sufficiently robust. The use of reduced coding rates and reduced order modulation schemes may be able to mitigate the effects of some poor channels, but it is likely that there will still be channels of poor enough quality that user devices are unable to reliable detect and estimate control and or payload data from received signals. Furthermore, there may be limits within a system that restrict the coding rates and modulation orders that may be used. For example, user device capabilities, compatibility issues and system parameters may lead to minimum coding rates which are supported by the system, thus limiting the gains in estimation accuracy that obtained by limiting the coding rate. Furthermore, devices such as MTC devices, which are low complexity and low power, may not have the capability to perform decoding of data which has been encoded with complex encoding techniques.

User device 103 of FIG. 1 is an example of a non-mobile user device which may not experience channel conditions sufficient for accurate detection and estimation of control and or payload data from received signals. As can be seen from FIG. 1, user device 103 is stationary and located in the basement of a house and therefore signals representing user device control data and payload data may be received at a signal strength and or quality which is not sufficient for accurate data detection and estimation, even with the use of low codes rates and modulation orders. Consequently, smart meter 103 provides an example of a user device where the above described reception routine may be insufficient to achieve the accurate recovery of user device control and payload data. As well as user devices in hard to reach locations i.e. basements, user device which are near the border of a cell served by infrastructure equipment may also experience similar problems due to reception of highly attenuated signals.

Signal Repetition

In order to address the above highlighted deficiencies and problems, it has been previously proposed that a form of signal repetition may be utilised in order to improve the strength and or quality of the signal received at user devices. In particular, when the received signal strength of a single instance of signals representing data is insufficient to enable reliable data detection and estimation. Repeating transmission of signals representing data provides a more simple arrangement for improving the detection and estimation of communicated data without significantly increasing processing power requirements and can be used for low data rate and delay tolerant applications. Furthermore, repetition can use coding, modulation and other communications parameters which are determined by a standard, such as LTE, and therefore may be compatible with that standard.

Figure 4:
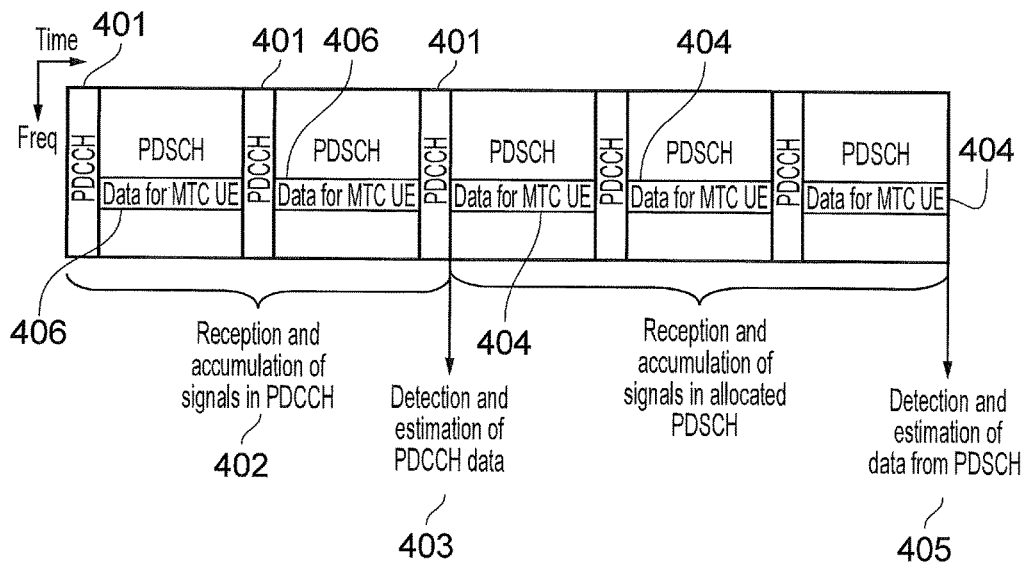
FIG. 4 provides a schematic diagram of LTE subframes where signal repetition is implemented.

FIG. 4 provides a schematic illustration of a series of subframes where an example signal repetition procedure is implemented. The principle of signal repetition is signals that represent a same instance of control and/or payload data for a user device are repeatedly transmitted by the infrastructure equipment over one or more subframes or frames. The signals may be in a substantially similar position or in substantially similar set of resources of the wireless access interface in each of the subframes or frames so that they propagate over a substantially similar channel. However in some examples the repeated signals may be transmitted in different resources in each subframe or frame where differences in channel across which the signals are transmitted are mitigated for example by equalisation. In other examples the signals may be repeated within a same subframe or frame. The receiver of the user device is then configured to receive each of the repeated signals and to store signals representing the repeated signals in a memory, where the stored signals may take the form of sampled un-demodulated baseband signals, soft estimates of the data, or hard estimates of the data. The receiver then aggregates, accumulates or combines the stored signals, by summation or averaging for example, so that the relative received strength of the combined signals representing the user device control data and payload data is increased or additional coding bits are available for data estimation and correction. The user device then proceeds to estimate the control data from the combined signal, where the control data indicates the location of the payload data in the combined signal representing the payload data intended for the user device. By the following this procedure it is then possible for the accuracy of detection and estimation of the user control and payload data to be increased. Returning to FIG. 4, signals representing control data are repeated in the PDCCH 401 of three consecutive subframes. The repeated signals of the PDCCH 401 which represent control data are stored and then accumulated 402 and the control data intended for the user device estimated from the accumulated PDCCH at 403. The estimated control data provides the user device with an indication of the location in the PDSCH of signals representing the user device's payload data 404. The user device then stores and accumulates the signals received from the indicated location 404 of the PDSCH in the next three subframes. The user device then recovers an estimate of its payload data from the accumulated PDSCH signal at 405. In this manner an increased likelihood of a correct estimation of the payload data can be achieved without substantially altering parameters of the signals and data such as transmit power, coding rates and or modulation schemes. Accordingly, a transmitter and a receiver performing the above describe repetition can be compatible with other LTE devices because signal transmission characteristics such as coding rates have not been modified.

Figure 5:
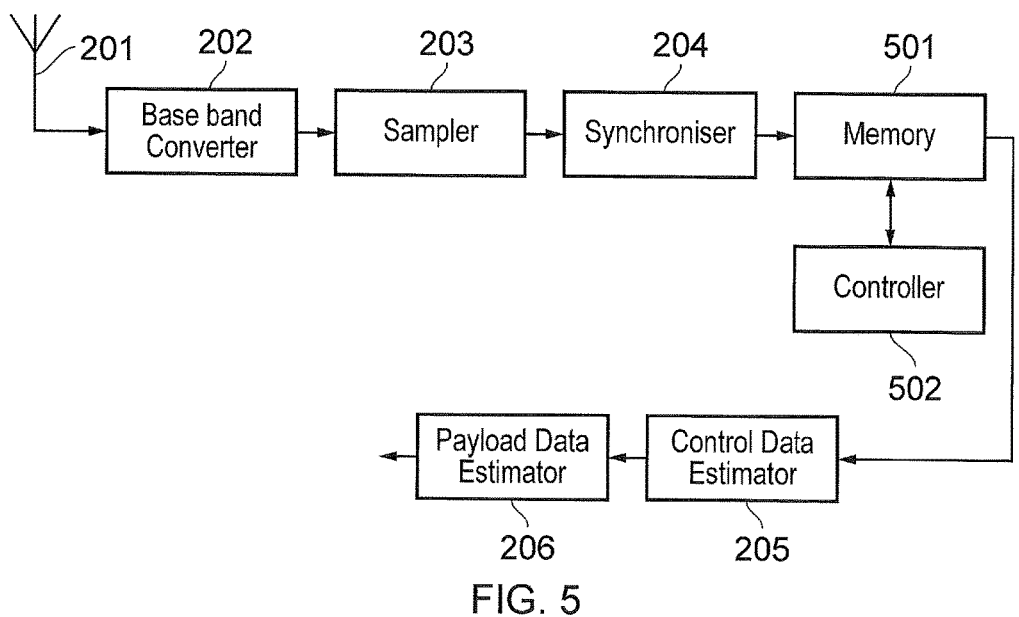
FIG. 5 provides a schematic diagram of a receiver of a user device configured to receive repeated signals.

FIG. 5 provides a simplified schematic diagram of an example user device receiver which is configured to receive repeated data transmissions. The structure of the receiver is substantially similar to that illustrated in FIG. 2 but further includes a memory 501 such as a buffer memory which is configured to store received repeated signals. The memory 501 stores the received signals representing the user device control data and the payload data, and under the control of a controller 502, passes the signals to the signal data estimator 205 and the payload data estimator 206. The signals may be passed to the relevant estimator when a predetermined number of repeated signals have been received or when the accumulated signals achieve an amplitude, via summation for example, sufficient to enable reliable detection and estimation of the data to be achieved. However, the exact process by which the received signals are combined may vary and is discussed in more detail below. The controller may also be communicatively linked to the other elements of the receiver in order to configure the elements to store and accumulate signals from the relevant portions of the PDSCH as indicated by recovered control data. For example, the controller may require information from the control data estimator in order to configure the receiver to receive and store signals representing data from appropriate parts of the PDSCH. The memory 501 may include separate memories for the storage and accumulation of signals representing the control data the payload data or other forms of data. Furthermore the configuration of the functional elements of the receiver may vary depending on the form of repetition being utilised. For example, for repetition techniques where signals are combined after initial detection and estimation has taken place, an additional estimator stage(s) may be required or the organisation of the receiver adapted accordingly.

In order for the repetition structure of FIG. 4 to be implemented, the user device may require an indication of commencement of the repetition so that it can begin to store the relevant received signals. However, this may cause problems if the indication signal itself cannot be received without repetition. An alternative implementation is to configure the memory 501 to be a buffer type memory that stores a maximum number of instances of signals and once the limit is reached, discards the oldest signal instance and stores the most recently received signal instance. This process can continue for example until the accumulated signal reaches a signal strength which is sufficient for accurate data detection and estimation, thus indicating the buffer is predominantly made up of the desired repeated signals. This may occur for example due to the correlation between the repeated signals representing the user data and the lack of correlation between the portions of the frames or subframes which are not repeated i.e. portions of the PDCCH which do not apply to the user device and therefore change between frames or subframes in which the signals for the user device are repeated. Another alternative is for the infrastructure to continue to repeat signals until an acknowledgment is received from the user device indicating that the data represented by the repeated signals has been accurately detected and estimated.

Although, the repetition scheme depicted in FIG. 4 provides a number of advantages, there are also associated costs. For example, increased resources are utilised in order to send data to the user device, where in FIG. 4 approximately three times the normal resources are utilised to transmit the payload data to the user device. Although this is an obvious disadvantage, it may be mitigated by the fact that communication involving repetition may be predominantly used in off peak periods where usage of the communications system is low, for example, during the night. This also fits in with the properties of low cost MTC devices such as smart meters which are likely to have delay tolerant data and therefor transmit data during off peak periods.

In LTE systems, in order to maintain compatibility with legacy LTE user devices that do not support repetition, there may have to be a one-to-one correspondence between control data indicating where user device payload data is located in the corresponding PDSCH and the actual location of the payload data. For example, even though the payload data transmitted in 406 is not detected by the user device, the payload still has to be transmitted or the corresponding resources not used by another user device because the control data corresponding to 406 will still specify that there is data for the user device in portion 406 of the PDSCH. If this were not the case, it may be possible for the scenario where two different portions of the control data specify that payload data for two different user devices are at the same location in the PDSCH. The requirement of one-to-one mapping of PDSCH resources to one user device therefore results in an inefficient use of downlink resources. However, in some examples the one-to-one mapping may be broken by signalling the change prior to the commencement of any repetition.

In some examples of signal repetition, in addition to transmitting signals representing identical control data and payload data for a particular user device in a substantially identical location in each frame or subframe, the entirety of the frames or subframes may have to be repeated in a substantially identical manner. This therefore decreases flexibility and further reduces efficiency. Furthermore, in some examples where channel conditions or coding rates etc. for transmitting data to a user device are poor and or high, a large number of repetitions may be required for a signal of sufficient strength/or sufficient information to be accumulated at the user device. Consequently, because the accumulation of the signals representing the control data and the payload data are not performed concurrently, the delay in receiving the payload data may be significant. For example, if a required number of repetitions in terms of subframes is large i.e. 100, it may be up to 200 subframes before the payload data can be recovered. In such an example, if the subframes are 1 ms in duration, a 200 subframe delay may result in a delay of 0.2 s, which may be unacceptable in some scenarios or to some user devices. Further still, with large repetition numbers user devices may have to be in a receiving mode for a significant period of time as opposed to a reduced power mode, therefore consuming an increased amount of power. This may be particularly problematic for low power, battery power devices such as MTC devices, whose time spent receiving and transmitting signals should be kept to a minimum if possible.

Repetition has been described in general terms up to this point, however, there are a number of alternative implementations of repetition and therefore a number of different methods for accumulating and combining received repeated signals. Two example repetition techniques are chase combining and incremental redundancy, which may be implemented as part of hybrid ACK procedures. Chase combining includes repeatedly transmitting a same instance of signals or portions of a same instance of signals that represent a same instance of data and then combing these signals at the receiver either pre or post demodulation. Consequently, chase combining may be viewed as increasing the signalto-interference-plus-noise ratio (SINR) of the received signal. Incremental redundancy includes repeating signals which are different but represent a same instance of data, for example different coded versions or different code bits of all or part of a same instance of data may be transmitted during each repetition. Consequently, incremental redundancy may be viewed as increasing the strength of the error correction coding at the receiver with the reception of each repeated signal. At a user device receiving repeated signals, there are a variety of methods that may be used to accumulate or combine the received repeated signals. For example, in chase combining stored sampled baseband signals that represent the repeated signals may be combined via equal-gain combining or maximum-ratio combining. The combining may also be performed either pre-equalisation or post-equalisation. In another example, combining of the signals may occur once soft or hard decisions have been performed on each of the received equalised repeated signals. For instance, an average may be taken over the soft decision from each instance of the repeated signals and then a hard decision taken to estimate the data. Alternatively, a majority vote system may be employed with hard decisions from each of the repeated signals. For incremental redundancy, combining of baseband signals may not be possible due to the differing repeated signals and therefore combining of signals representing soft or hard decisions may be more appropriate.

The aforementioned repetition and combining methods are merely examples and any suitable methods known in the art may be used. Different methods of repetition and of combining the received repeated signals each have their own advantages and disadvantages. For instance, if sampled baseband signals are combined, it is the received signals representing the user device control data and the payload data that are required to be stored as opposed to the data estimates themselves. Therefore, it is sampled versions of portions of the baseband signal that are stored. Storing signals in this manner may require significantly more memory than storage of signals representing estimates of the underlying data as sampling has to be performed at a frequency and with a number of quantisation levels that are sufficient to achieve a combined signal from which control data and or payload data can be accurately detected and estimated. The actual sampling frequency will be dependent on, among other things, the baseband frequencies via the sampling theorem, and the number of quantisation levels is likely to be dependent on, among other things, at least the modulation scheme, coding rates, and the required signal-to-noise ratio (SNR). However, if signals are combined post-equalisation and or -post-demodulation, then memory requirements may be reduced. In another example, if incremental redundancy is utilised, different coding bits are transmitted with each repetition and so cannot merely be combined via summation. This approach may therefore require increased memory compared to chase combining of soft or hard decisions because one symbol in memory corresponds to one received symbol, whereas in chase combing one symbol in memory may be a summation of multiple repeated symbols. In examples where combining of signals representing the user payload data is performed post-equalisation and after preliminary soft or hard estimates, it may be required that user device control data has already been detected and estimated. The user device control data may be required because it includes information on the location and coding etc. of the user payload data that is necessary to detect and estimate the user device payload data. Consequently, such a method may be suited to examples of signal repetition where control data is received and estimated prior to reception of the repeated signals representing the user payload data. With regards to repeated signals representing user device control data, estimation of the data contained therein may be performed at any point after reception, independent of the combining method. This approach is possible by virtue of information on the location of control information in frame or subframe and any coding of the control data being predefined and therefore known by the user device prior to reception.

Figure 6:
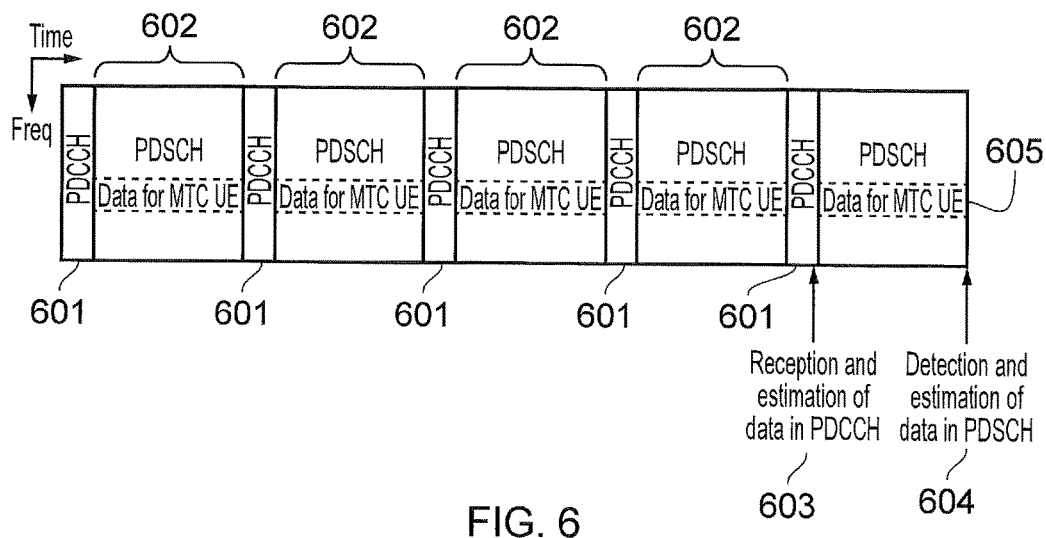
FIG. 6 provides a schematic diagram of LTE subframes where signal repetition is implemented.

FIG. 6 provides an alternative implementation of signal repetition which may decrease the acquisition time of the payload data. In contrast to FIG. 4 where accumulation of signals representing control data and payload data is done during different subframes, in FIG. 6 whilst the signals transmitted across the PDCCH 601 are being accumulated all the signals transmitted across the PDSCH 602 are buffered. Once the location of the signals representing the user device payload data in the PDSCH is known and the parameters of the payload data are known, the payload data may be detected and estimation from the buffered accumulated signal at 604. If further accumulation is required after estimation of the control data, the receiver can store and accumulate only the relevant part of the PDSCH signals 605 indicated by the recovered control data. Although this implementation may reduce acquisition delays, it requires a significant amount of memory in order to store and accumulate all or a substantial proportion of the signals which represent the PDSCH data prior to detection and estimation of the user device control data. In the case of low cost and reduced power devices such as MTC devices, this may not be a practical solution.

Narrow Bandwidth Signal Repetition

Figure 7:
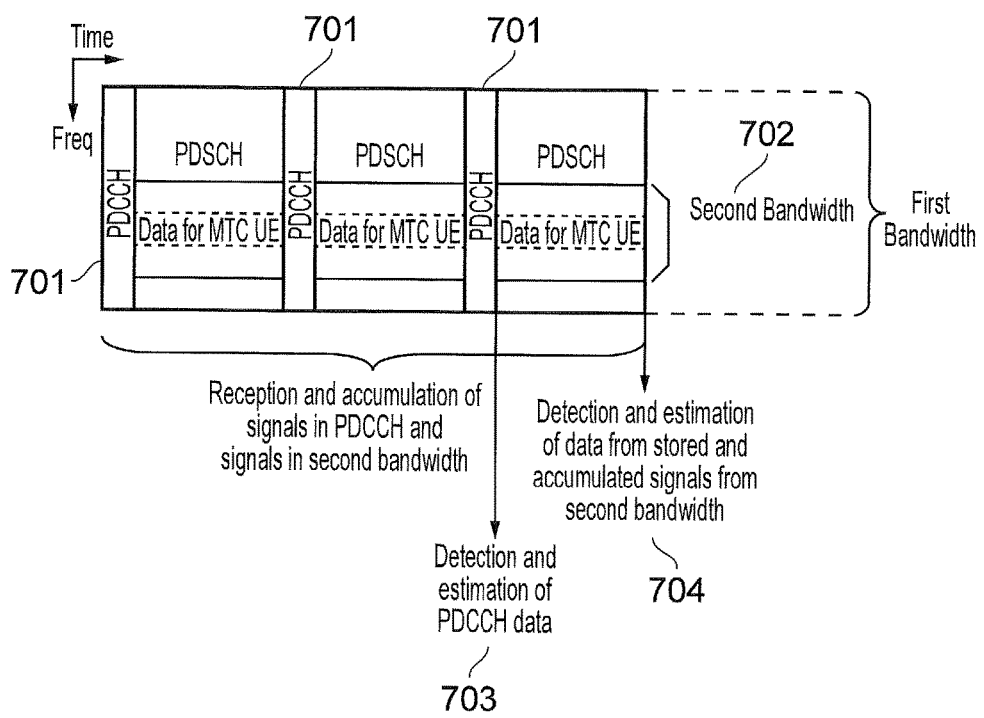
FIG. 7 provides a schematic diagram of LTE subframes where signal repetition is implemented in accordance with an embodiment of the present technique.

FIG. 7 illustrates an example embodiment of a repetition procedure in accordance with the present technique. Repetition of signals representing user device control data 701, using for example chase combining or incremental redundancy as previously described, is performed within the system bandwidth or first bandwidth of the system in a manner similar to that described with reference to FIG. 4 or 6. However, signals representing the user device payload data are transmitted using chase combining or incremental redundancy for example, within a predetermined second bandwidth 702 within the PDSCH, where the second bandwidth is narrower than the first bandwidth of the system or current subframe and is also within the first bandwidth. The signals representing the user device payload data may or may not extend across the entirety of the second bandwidth and signals representing payload data for other user device (s) may also be transmitted across the second bandwidth. Consequently, a subset of the subcarriers of the data channel PDSCH are utilised for transmitting the repeated signals representing the user device payload data. A receiver as illustrated in FIG. 5 may therefore store and accumulate signals representing the received signals or the control data contained therein whilst simultaneously storing and accumulating signals representing received signals or the payload data contained therein without storing and/or accumulating signals transmitted across the entirety or a significant portion of the PDSCH bandwidth or first bandwidth. This is in contrast to existing techniques as previously described with reference to FIG. 6.

In some example embodiments the second bandwidth could be formed by a Virtual carrier arrangement. To support MTC terminals, it has been proposed to introduce a "virtual carrier" operating within a bandwidth of one or more "host carriers": the proposed virtual carrier concept preferably integrates within the communications resources of conventional OFDM based radio access technologies and subdivides frequency spectrum in a similar manner to OFDM. Unlike data transmitted on a conventional OFDM type downlink carrier, data transmitted on the virtual carrier can be received and decoded without needing to process the full bandwidth of the downlink OFDM host carrier. Accordingly, data transmitted on the virtual carrier can be received and decoded using a reduced complexity receiver unit: with concomitant benefits such as increased simplicity, increased reliability, reduced form-factor and lower manufacturing cost. The virtual carrier concept is described in a number of co-pending patent applications (including GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9]), the contents of which are incorporated herein by reference.

Once a sufficient number of instances of the repeated signals representing the control data, and in particular the user device control data, have been accumulated and combined, the user device control data is detected and estimated 703. In this case, a sufficient number of instances may for example refer to accumulating signals until the data can be detected, until a predetermined number of signals have been accumulated, or until the infrastructure equipment ceases repeating the relevant signals. Subsequently, if a sufficient number of repetitions of signals representing the user device payload have been accumulated and combined, the user device payload data is detected and estimated 704 from the appropriate location in the accumulated signals from the second bandwidth. This procedure enables accumulation of the signals representing the user device payload data to be performed concurrently with the accumulation of the signals representing the user device control data without buffering or storing signals transmitted and received across all of or a substantial portion of the PDSCH. Therefore improvements in the speed of data acquisition may be achieved compared to the procedure described with reference to FIG. 4, whilst also reducing the memory requirements compared to the procedure described with reference to FIG. 6. For example, if the PDSCH is 128 subcarriers in bandwidth and the predetermined bandwidth is 12 subcarriers, the user device may require approximately 90% less memory to store signals that include signals representing the user device payload data compared to storing all signals received from across the first bandwidth or the PDSCH. Consequently, by the use of large numbers of repetitions and use of the reception techniques described above, coverage of a mobile communications network may be extended to areas where user devices receive a weak signal which would normally not be sufficient for communicating with the network, without significantly increasing the memory requirements, costs or battery consumption of the user devices. This may be particularly relevant for battery powered devices such as MTC devices for example which require both their costs and energy consumption to be reduced and therefore may not be suited to existing repetition techniques.

In order for a user device to have knowledge of the second bandwidth, additional signalling indicating the second bandwidth may be required to be transmitted to the user device prior to commencement of repetition, for example, when a user device enters the coverage of an infrastructure equipment such as a base station or eNB. Alternatively, the second bandwidth may be hardcoded into repetition compatible user devices. In the former case, the infrastructure equipment may be configured to select an appropriate second bandwidth based on for example resource allocation demands, channel conditions, the number of device requiring repetition etc. As mentioned above, in some embodiments of the present technique, the second bandwidth may be equivalent to or substantially similar to a predetermined bandwidth of a virtual carrier (VC), which has been proposed in order to simplify the operation of MTC devices. In such an embodiment a separate second bandwidth in addition to the VC may not be required and therefore signalling of the second bandwidth may not be necessary, thus leading to improvements in system efficiency. In other embodiments of the present technique, the same predefined bandwidth may be allocated to multiple user devices requiring repeated signals. In this case, multiple different signals may be repeated within the second bandwidth of each subframe. In further embodiments the second bandwidth may be defined relative to the first bandwidth or the bandwidth of the PDSCH of each subframe. In such an embodiment the number of subcarriers in a radio frame or subframe or even OFDM symbol to OFDM symbol may change without the infrastructure having to re signal the second bandwidth. For example, the second bandwidth may be defined as subcarriers 36 to 60 or the subcarriers $5/8 \times S_t$ to $6/8 \times S_t$ where $S_t$ is the total number of subcarriers. However, regardless of the means by which the second bandwidth is indicated to the user device, improvements in power consumption and memory requirements can be achieved at the user device when large repetition numbers are utilised to extend the coverage of a mobile communications network.

In other embodiments, control information required to be received by the user device may be represented by signals which are transmitted over a bandwidth smaller than the first bandwidth or the available bandwidth of the subframe. The signals representing user device payload data may also be repeated separately from signals representing user device control data, such as, in systems where a one-to-one mapping from control data to the location of user device payload data is not required. This embodiment would therefore further simplify the reception routine of the user device and the cost and complexity of the user device because it will be required to operate over a reduced bandwidth.

In some embodiments, due to low coding rates, increased transmission power, increased frequency diversity etc., a larger number of instances of signals representing payload data may be required to be received compared to signals representing control data if the payload data is to be detected and estimated accurately. For instance, in some networks control data may be transmitted with lower coding rates and lower order modulations schemes compared to payload data. FIG. 8 provides an illustration of a repetition procedure in accordance with the present technique where a larger number instances of signals representing payload data are required to be accumulated compared to signals representing control data. In FIG. 8, three repetitions of signals forming the PDCCH 801 and representing user device control data are required to be stored and accumulated whereas five instances of the signals representing the payload 802 data are required. Whilst the signals received across the PDCCH are being accumulated, knowledge of the location of the signals representing the payload data with the second bandwidth is unknown and therefore the receiver of the user device stores and accumulates signals from the entirety or a significant proportion of the second bandwidth 702 of subframes 803. Once the control data has been detected and estimated from the accumulated signals representing the control data, and the location of the signals representing the payload data known, the receiver commences storing and accumulating only the signals from the specified location within the second bandwidth of frames 804. In some examples, because of the time taken to estimate the control data from the accumulated and combined control signals, the receiver may continue to buffer signals from the entirety of the second bandwidth until subframe three of FIG. 8 because knowledge of the location of the payload data signals within the predetermined bandwidth is not known until after the commencement of the PDSCH of frame three.

FIG. 9 provides an illustration of a repetition procedure in accordance with an example of the present technique where additional control information is transmitted outside of the PDCCH, for example, in an enhanced PDCCH (ePDCCH) in an LTE system. In this case the ePDCCH 901 may be located within the second bandwidth 702 so that the user device is able to receive the control data represented by signals transmitted over the ePDCCH without having to receive signals transmitted across the entirety or a substantial portion of the first bandwidth. The ePDCCH may convey additional control data required in order to detect and estimate the user device payload data and therefore may be required to be detected and estimated prior to detection and estimation of the payload data in the second bandwidth. Alternatively, the ePDCCH may convey information relating to uplink criteria and therefore should be received in a similar manner to signals transmitted over the PDSCH.

Figure 10:
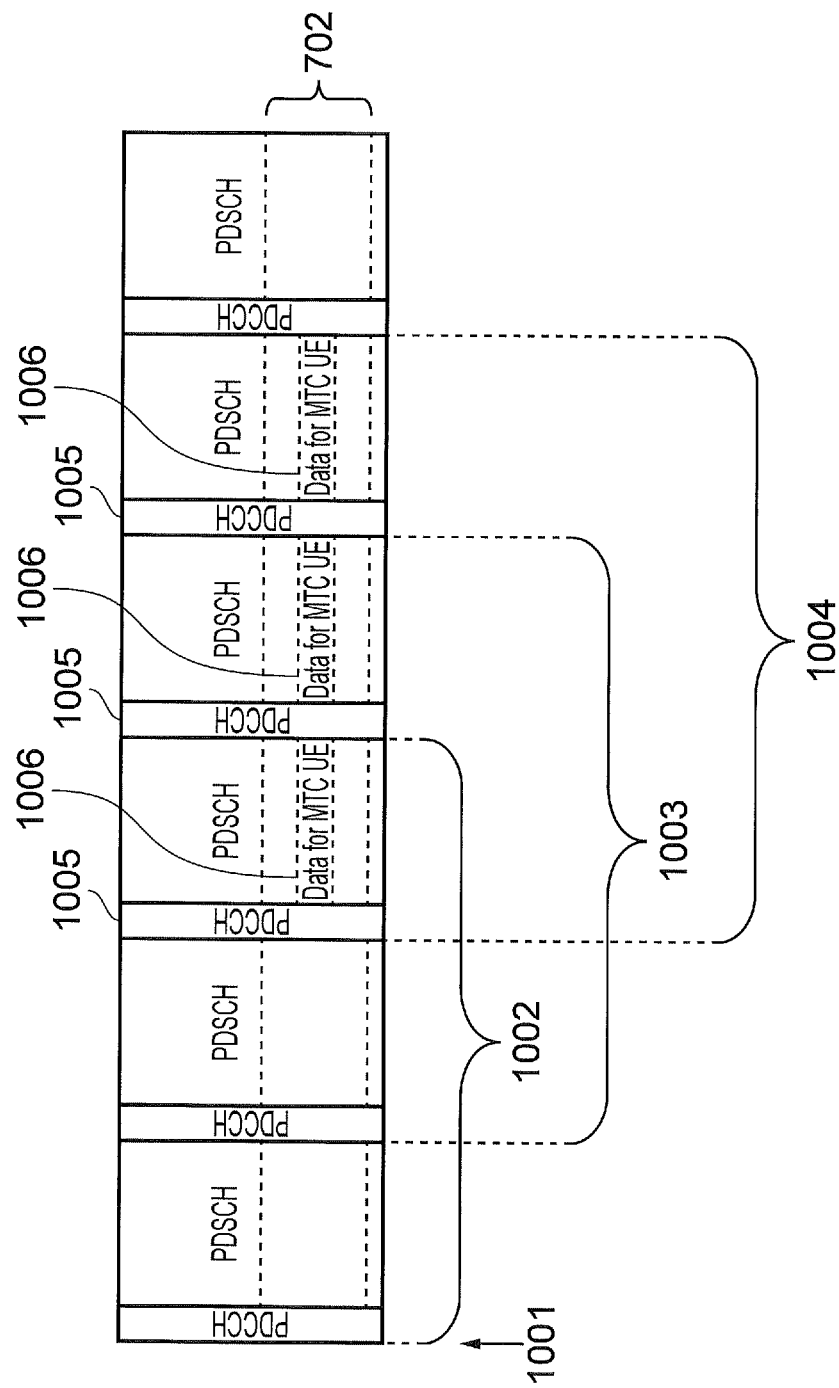
FIG. 10 provides a schematic diagram of LTE subframes where signals repetition and windowed signal reception is implemented in accordance with an embodiment of the present technique.

As previously described, the user device may require an indication of when signal repetition is set to commence so that the appropriate signals from the PDCCH and PDSCH can be stored and accumulated. Such an indication may be transmitted at a low code rate and modulation order so that the probability that it can be received without the need for repetition is maximised. However, in embodiments where an indication is not provided or cannot be reliably detected and estimated, a buffering procedure as previously described and shown in FIG. 10 may be used. In FIG. 10, buffering of the signals transmitted across the PDCCH and the predetermined bandwidth 702 begins at 1001. Three instances of the signals representing the user device control data and payload data are required to be accumulated and therefore the next three subframes are then buffered in the window 1002. The window then moves or slides by one subframe as each subframe is received as represented by windows 1003 and 1004, where a movement of one subframes represents the oldest received signals from a subframe being replaced in the buffer memory by relevant signals received from the most recent subframe. During the window represented by 1004, three instances of the PDCCH and PDSCH signals that include signals representing the user device control data 1005 and payload data 1006 have been stored and accumulated. Therefore the control data and the payload data may be detected and estimated, and the current accumulation procedure halted. The point at which a required number of repetitions have been stored may be indicated by the accumulated signals passing an amplitude threshold for example or substantially error-free decoding of the transmitted data.

Although embodiments of the present technique have been described with reference to the physical channels PDCCH and PDSCH of an LTE wireless communications interface, embodiments may also be applied to other physical channels of an LTE system, either individually or in combination with other channels. Likewise, although embodiments have been described with reference to a LTE systems and wireless access interfaces, embodiments of the present technique are not limited to LTE systems and may be implemented in any systems which have wireless access resources divided into temporal periods and or resources which may be divided up for the provision of a multiple access interface. Similarly, different repetition techniques and or combining techniques to those described above may also be used in conjunction with embodiments of the present technique.

Various further aspects and features of the present technique are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A communications system comprising an infrastructure equipment for forming part of a mobile communications network arranged to transmit and receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the infrastructure equipment is configured to transmit repeatedly signals representing a same instance of user device payload data in a second bandwidth, the second bandwidth being less than and within the first bandwidth and including a subset of the OFDM subcarriers, and user device is configured to receive one or more of the signals repeatedly transmitted across the second bandwidth, to store in a memory signals representing the repeatedly transmitted signals received across the second bandwidth, to combine the stored signals, and to detect the user device payload data from the combined signals, the user device having been provided with an indication of the second bandwidth.

2. A communications system according to clause 1, wherein the infrastructure equipment is configured to transmit repeatedly signals representing a same instance of user device control data in the first bandwidth, the user device control data providing an indication of a location of the signals representing the user device payload data in the second bandwidth, and the user device is configured to receive one or more of the signals representing the user device control data repeatedly transmitted across the first bandwidth, to store in the memory signals representing the repeatedly transmitted signals received across the first bandwidth, to combine the stored signals representing the repeatedly transmitted signals received across the first bandwidth, and to detect the user device control data from the combined signals representing the repeatedly transmitted signals received across the first bandwidth, the detection of the user device payload data from the combined signals received across the second bandwidth being based on the indication of the location of the signals representing the user device payload data in the second bandwidth.

3. A communications system according to clauses 1 or 2, wherein the wireless access interface provided by the plurality of OFDM subcarriers is divided into a plurality of time periods and the repeated signals representing the user device payload data are transmitted in a same set of resources of the wireless access interface in a first time period and in a second time period.

4. A communications system according to clause 2, wherein the infrastructure equipment is configured to transmit the indication of the second bandwidth to the user device prior to the repeated transmissions of the signals representing the user device control data.

5. A communications system according to any of clauses 1 to 4, wherein the user device is configured to receive user device payload data within a virtual carrier of a predetermined bandwidth, the second bandwidth being approximately equal to the predetermined bandwidth, and the predetermined bandwidth includes a set of the OFDM subcarriers that is substantially similar to the OFDM subcarriers that form the subset of the OFDM subcarriers included in the second bandwidth.

6. A communications system according to any of claims 1 to 5, wherein the communication system operates in accordance with 3GPP LTE.

7. A communications system according to any of clauses 1 to 6, wherein a number of repeated transmissions of signals representing the user device payload data is greater than a number of repeated transmissions of the signals representing the user device control data.

8. An infrastructure equipment for forming part of a mobile communications network arranged to transmit and to receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the infrastructure equipment is configured to transmit repeatedly signals representing a same instance of user device payload data in a second bandwidth, the second bandwidth being less than and within the first bandwidth and including a subset of the OFDM subcarriers 9. An infrastructure equipment according to clause 8, wherein the infrastructure equipment is configured to transmit repeatedly signals representing a same instance of user device control data in the first bandwidth, the user device control data providing an indication of a location of the signals representing the user device payload data in the second bandwidth 10. A method of transmitting and receiving data in a communications system comprising an infrastructure equipment for forming part of a mobile communications network arranged to transmit and to receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the method comprising transmitting repeatedly signals representing a same instance of user payload data in a second bandwidth from the infrastructure equipment, the second bandwidth being less than and within the first bandwidth and including a subset of the OFDM subcarriers;

receiving one or more of the repeatedly transmitted signals across the second bandwidth at the user device, storing in a memory signals representing the repeatedly transmitted signals received across the second bandwidth at the user device, combining the stored signals at the user device, and detecting the user device payload data from the combined signals at the user device, the user device having been provided with an indication of the second bandwidth.

11. A method according to clause 10, the method comprising transmitting repeatedly signals representing a same instance of user device control data in the first bandwidth from the infrastructure equipment, the user device control data providing an indication of a location of the signals representing the user device payload data in the second bandwidth, receiving one or more of the signals representing the user device control data repeatedly transmitted across the first bandwidth at the user device, storing in the memory signals representing the repeatedly transmitted signals received across the first bandwidth, combining the stored signals representing the repeatedly transmitted signals received across the first bandwidth, and detecting the user device control data from the combined signals representing the repeatedly transmitted signals received across the first bandwidth, the detection of the user device payload data from the combined signals received across the second bandwidth being based on the indication of the location of the signals representing the user device payload data in the second bandwidth.

12. A method of transmitting data from an infrastructure equipment for forming part of a mobile communications network arranged to transmit and receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, the method comprising transmitting repeatedly signals representing a same instance of user device payload data in a second bandwidth, the second bandwidth being less than and within the first bandwidth and including a subset of the OFDM subcarriers.

13. A method according to clause 12, the method comprising transmitting repeatedly signals representing a same instance of user device control data in the first bandwidth from the infrastructure equipment, the user device control data providing an indication of a location of the signals representing the user device payload data in the second bandwidth.

The invention claimed is:

1. A communications system comprising:

an infrastructure equipment configured to form part of a mobile communications network configured to transmit and receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the infrastructure equipment is further configured:

to transmit repeatedly signals representing a same instance of user device payload data in a second bandwidth alternatingly with, a same instance of control data in the first bandwidth, the second bandwidth being less than and within the first bandwidth and including a subset of the OFDM subcarriers, the same instance of the control data being transmitted in a portion of the first bandwidth that excludes the second bandwidth; and the user device is configured:

to receive one or more of the signals repeatedly transmitted across the second bandwidth,
to store in a memory signals representing the repeatedly transmitted signals received across the second bandwidth,
to combine the stored signals, and
to detect the user device payload data from the combined signals, the user device having been provided with an indication of the second bandwidth.

2. The communications system as claimed in claim 1, wherein the user device control data provides an indication of a location of the signals representing the user device payload data in the second bandwidth, and
the user device is configured:
to receive one or more of the signals representing the user device control data repeatedly transmitted across the first bandwidth,
to store in the memory signals representing the repeatedly transmitted signals received across the first bandwidth,
to combine the stored signals representing the repeatedly transmitted signals received across the first bandwidth, and
to detect the user device control data from the combined signals representing the repeatedly transmitted signals received across the first bandwidth, the detection of the user device payload data from the combined signals received across the second bandwidth being based on the indication of the location of the signals representing the user device payload data in the second bandwidth.

3. The communications system as claimed in claim 1, wherein the wireless access interface provided by the plurality of OFDM subcarriers is divided into a plurality of time periods and the repeated signals representing the user device payload data are transmitted in a same set of resources of the wireless access interface in a first time period and in a second time period.

4. The communications system as claimed in claim 2, wherein the infrastructure equipment is configured to transmit the indication of the second bandwidth to the user device prior to the repeated transmissions of the signals representing the user device control data.

5. The communications system as claimed in claim 1, wherein the user device is configured to receive user device payload data within a virtual carrier of a predetermined bandwidth, the second bandwidth being approximately equal to the predetermined bandwidth, and the predetermined bandwidth includes a set of the OFDM subcarriers that is substantially similar to the OFDM subcarriers that form the subset of the OFDM subcarriers included in the second bandwidth.

6. The communications system as claimed in claim 1, wherein the communication system operates in accordance with 3GPP LTE.

7. The communications system as claimed in claim 1, wherein a number of repeated transmissions of signals representing the user device payload data is greater than a number of repeated transmissions of the signals representing the user device control data.

8. An infrastructure equipment configured to form part of a mobile communications network and including at least a processor coupled to a memory and configured to transmit and to receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the processor is further configured:
to transmit repeatedly signals representing a same instance of user device payload data in a second bandwidth alternatingly with a same instance of control data in the first bandwidth, the second bandwidth being less than and within the first bandwidth and including a subset of the OFDM subcarriers, the same instance of the control data being transmitted in a portion of the first bandwidth that excludes the second bandwidth.

9. The infrastructure equipment as claimed in claim 8, wherein the user device control data provide an indication of a location of the signals representing the user device payload data in the second bandwidth.

10. A method of transmitting and receiving data in a communications system comprising an infrastructure equipment configured to form part of a mobile communications network configured to transmit and to receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, and the method comprising:
transmitting repeatedly signals representing a same instance of user payload data in a second bandwidth alternatingly with a same instance of control data in the first bandwidth, from the infrastructure equipment, the second bandwidth being less than and within the first bandwidth and including a subset of the OFDM subcarriers, the same instance of the control data being transmitted in a portion of the first bandwidth that excludes the second bandwidth;
receiving one or more of the repeatedly transmitted signals across the second bandwidth at the user device;
storing in a memory signals representing the repeatedly transmitted signals received across the second bandwidth at the user device;
combining the stored signals at the user device; and
detecting the user device payload data from the combined signals at the user device, the user device having been provided with an indication of the second bandwidth.

11. The method as claimed in claim 10, wherein the user device control data provides an indication of a location of the signals representing the user device payload data in the second bandwidth, and the method further includes:
receiving one or more of the signals representing the user device control data repeatedly transmitted across the first bandwidth at the user device;
storing in the memory signals representing the repeatedly transmitted signals received across the first bandwidth;
combining the stored signals representing the repeatedly transmitted signals received across the first bandwidth; and
detecting the user device control data from the combined signals representing the repeatedly transmitted signals received across the first bandwidth, the detection of the user device payload data from the combined signals received across the second bandwidth being based on the indication of the location of the signals representing the user device payload data in the second bandwidth.

12. A method of transmitting data from an infrastructure equipment configured to form part of a mobile communications network configured to transmit and receive data to and from a user device via a wireless access interface, the wireless access interface being provided by the infrastructure equipment using a plurality of Orthogonal Frequency Division Multiplexing (OFDM) subcarriers, the plurality of OFDM subcarriers extending across a first bandwidth, the method comprising:

transmitting repeatedly signals representing a same instance of user device payload data in a second bandwidth alternatingly with a same instance of control data in the first bandwidth, the second bandwidth being less than and within the first bandwidth and including a subset of the OFDM subcarriers, the same instance of the control data being transmitted in a portion of the first bandwidth that excludes the second bandwidth.

13. The method as claimed in claim 12, the method wherein the user device control data provides an indication of a location of the signals representing the user device payload data in the second bandwidth.

* * * * *